Figures 1, 2:
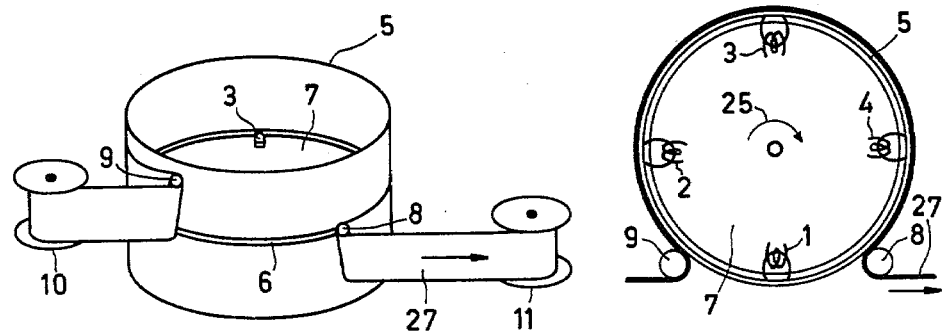

United States Patent [19]

deNiet

[11] 4,358,799
[45] Nov. 9, 1982

[54] APPARATUS FOR RECORDING AND/OR REPRODUCING SIGNALS

[75] Inventor: Edmond deNiet, Eindhoven, Netherlands

[73] Assignee: U.S. Philips Corporation, New York, N.Y.

[21] Appl. No.: 110,289

[22] Filed: Jan. 7, 1980

[30] Foreign Application Priority Data

Jan. 17, 1979 [NL] Netherlands ............ 7900351

[51] Int. Cl.³ ............ G11B 5/52; G11B 15/60
[52] U.S. Cl. ............ 360/84; 360/130.24
[58] Field of Search ............ 360/84, 64, 130.24

[56] References Cited

U.S. PATENT DOCUMENTS

| | | | |
|---|---|---|---|
| 3,320,370 | 5/1967 | Barry | 360/84 |
| 3,333,063 | 7/1967 | Stratton | 360/64 |
| 3,378,646 | 4/1968 | Shashov et al. | 360/84 |
| 3,476,873 | 11/1969 | Bowe et al. | 360/64 |
| 3,939,494 | 2/1976 | Okuda | 360/130.24 |
| 4,032,982 | 6/1977 | Arter et al. | 360/84 |
| 4,179,717 | 12/1979 | Maxey | 360/84 |
| 4,183,067 | 1/1980 | Kihara et al. | 360/84 |

Primary Examiner—Vincent P. Canney
Attorney, Agent, or Firm—Thomas A. Briody; Robert T. Mayer; Algy Tamoshunas

[57] ABSTRACT

A helical scan video recorder having a reduced drum diameter in comparison with a two-head video recorder by the use of n heads, n being greater than two, and a tape wrap angle greater than $$\frac{n-1}{n} \times 360°.$$

An important additional advantage of this recorder is that reproduction during recording (monitoring) is possible without the use of additional heads.

5 Claims, 5 Drawing Figures

APPARATUS FOR RECORDING AND/OR REPRODUCING SIGNALS

The invention relates to an apparatus for recording and/or reproducing signals on a magnetic record carrier in the form of a tape, comprising a head drum with a gap which is disposed in a plane normal to the head drum axis, in which the tape-like record carrier can be wrapped around the drum in accordance with a helix over at least a part of the drum circumference, and a rotatable head support inside said drum, on which heads are arranged in the plane in which said gap is disposed, in such a way that said heads are capable of making magnetic contact with the record carrier via said gap.

Such apparatus having two heads is frequently used for recording and reproducing video signals. The tape-like record carrier is then wrapped around the head drum over 180°.

For minirecorders, which are required especially for portable video recording equipment, it is desirable to minimize the dimensions. A major constraint in this respect is the necessary diameter of the head drum.

For example at equal track width and tape speed the drum diameter may be substantially halved if instead of two heads one head with a tape wrap angle of 360° is used. In this respect two wrapping methods are known: the so-called alpha wrap and the so-called omega wrap. However, a drawback of the alpha wrap is that there is no space left on the tape for a synchronizing and/or audio track in the longitudinal direction of the tape and a drawback of the omega wrap is that the tape cannot be wrapped round the drum over the full 360°, so that the video signals read by the rotary head exhibit a dropout every revolution. The two-head apparatus does not have these drawbacks. However, doubling the number of heads leads to the drum diameter being doubled.

The invention is based on the recognition that a further increase of the number of heads (three or more), apart from leading to a tape wrap angle smaller than 180°, may also lead to a tape wrap angle greater than 180° and an associated reduction of the drum diameter, without the above drawbacks of the single-head machine, namely the lack of space for sync or audio tracks, or a dropout in the signal. The invention is, therefore, characterized in that n heads are uniformly spaced from each other on the head support, n being greater than two, and that the apparatus is adapted to enable the tape to be arranged over at least $$\frac{n-1}{n} \times 360°$$

of the drum circumference with such a pitch that at least $$\frac{n-1}{n} \times 360°$$

of the gap circumference is covered by the record carrier.

For signal recording the apparatus in accordance with the invention may further be characterized by a signal input, first switching means for sequentially connecting said signal input to the heads in accordance with a cyclic permutation in synchronism with the rotation of the head support, the n heads being sequentially connected to said signal input in a sequence corresponding to the direction of rotation of the head support for the $$\frac{n-1}{n}$$

part of a revolution of the head support.

For reproducing the recorded signals the apparatus may further be characterized by a signal output and switching means for sequentially connecting said signal output to the heads in accordance with a cyclic permutation in synchronism with the rotation of the head support, the n heads being sequentially connected to said signal output in a sense corresponding to the direction of rotation of the head support for the $$\frac{n-1}{n}$$

part of a revolution of said head support.

An important additional advantage of the apparatus in accordance with the invention is that at least two heads are always in contact with the record carrier via the gap, which enables "monitoring" or the direct reproduction of signals being recorded. To this end the apparatus in accordance with the invention, which is adapted to record signals, is characterized by a signal output and second switching means for connecting the heads to said signal output in such a way that a head, which is in magnetic contact with the record carrier and which is not simultaneously connected to the signal input is always connected to the signal output.

A preferred embodiment of the apparatus in accordance with the invention with reproduction-during-recording capability may further be characterized by means for the actuation of the second switching means in synchronism with the rotation of the head support and with the first switching means, in such a way that each time the signal output is connected to a head via said second switching means one revolution of the head support after said head has been connected to the signal input via the first switching means.

Figure 3:
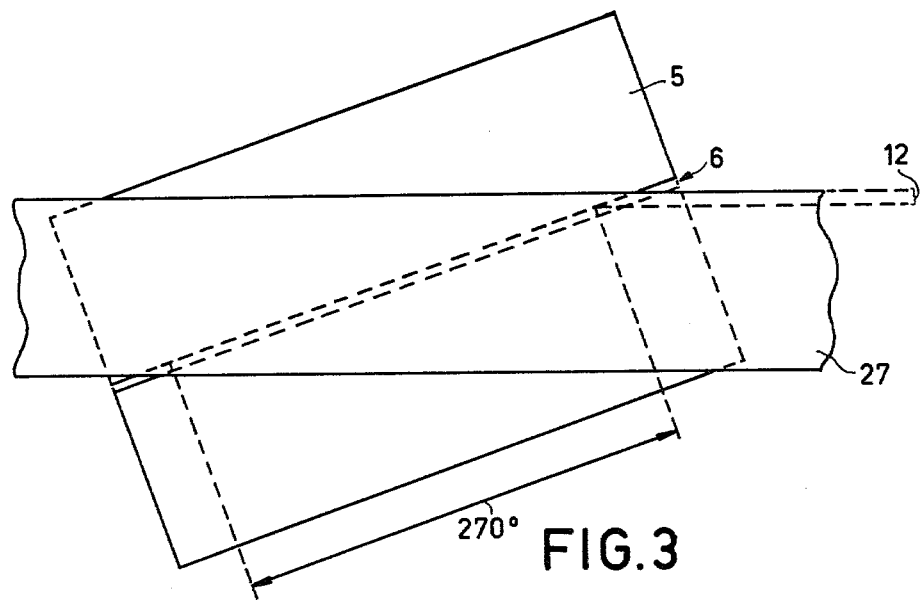
Figure 4:
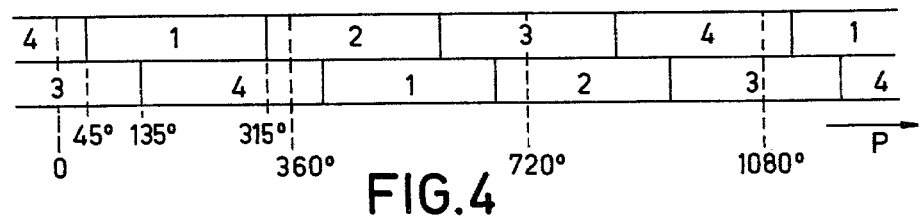
Figure 5:
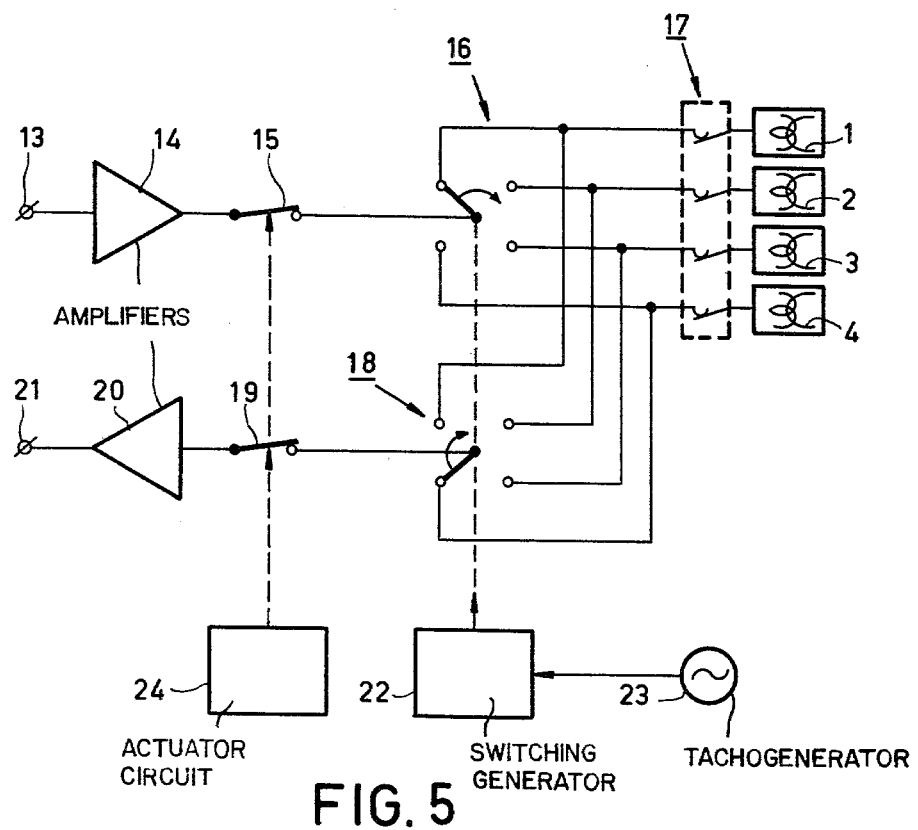

The invention is described in more detail with reference to the drawing, in which FIG. 1 is a schematic perspective view of an apparatus in accordance with the invention, comprising four heads, FIG. 2 is a schematic plan view of the apparatus of FIG. 1, FIG. 3 shows a development of the drum of the apparatus of FIGS. 1 and 2 relative to a tape, FIG. 4 is a diagram which represents the energizing sequence of the heads of the apparatus of FIGS. 1 and 2 for recording (upper bar) and for simultaneous reproduction (lower bar) as a function of the head position P expressed in degrees, and FIG. 5 schematically represents a circuit for recording and/or reproducing signals by means of the apparatus of FIGS. 1 and 2.

The apparatus in accordance with FIGS. 1 and 2 comprises a head drum 5 with a gap 6. The drum 5 accommodates a rotary head support 7 on which are arranged four heads 1, 2, 3 and 4. A magnetic tape 27 is wrapped around the drum over more than 270° and is guided by guide rollers 8 and 9. The tape 27 is unwound from a supply reel 10 in the direction of the arrow and, after passing around the head drum, is wound onto a take-up reel 11. The head support 7 may for example rotate in the direction indicated by the arrow.

If, as is shown, four heads are used with a tape wrap angle of at least 270°, continuous tracks may be written on the tape by sequentially energizing the head in a suitable manner over 270° of one revolution of the head support 7. The pitch of the wrap then also determines the track length. This is explained by means of FIG. 3.

FIG. 3 shows a development of the drum 5 with the gap 6 over which the tape 27 is arranged. The tape 27 covers at least ¾ of the gap 6. For this purpose it is necessary that the tape wrap angle is at least 270°. If the gap 6 is covered over more than 270°, the heads being energized over 270°, space (designated 12 in FIG. 3) is left on the tape for a longitudinal synchronization and-/or audio track.

FIG. 4 represents the energizing sequence of the heads 1 through 4, the head position P being expressed in degrees reckoned from the position shown in FIG. 2 in the direction of the arrow 25. At P=45° head 1 begins to write a signal. At P=315° (270° further) head 2 begins to write etc. in accordance with a cyclic permutation. Thus four consecutive tracks are written on the tape 27 in three revolutions of the head support 7.

The lower bar of FIG. 4 represents a suitable energizing scheme for the simultaneous reproduction of recorded signals, each head reading over 270°, the recorded signals being reproduced by that head which is in contact with the tape and which most closely follows the writing head. The head 4 then begins to read at P=135°. At P=405°, 270 degrees further, head 1 begins to read etc. in accordance with a cyclic permutation. Thus, a head always begins with a read period 360° or one revolution of the head support 7 after this very head began with a write period.

Without some form of tracking the reading head will not move exactly over the last track written during "monitoring", but only over a part of said track (over ⅔ of said track in the four-head apparatus shown). This is less problematic because the other part of said head moves over an unrecorded part of the tape.

FIG. 5 shows a circuit for recording and/or reproducing signals by means of the apparatus in accordance with FIGS. 1 and 2. It comprises a signal input 13 connected to a signal amplifier 14, which may also accommodate other functions such as the fm modulation. Via a switch 15, which is closed during recording, the output of amplifier 14 leads to a switch 16 which sequentially applies the signal to the heads 1, 2, 3 and 4 via for example slip rings 17 on rotary transformers in accordance with a cyclic permutation in a sequence described with reference to FIG. 4. Although the switch 16 is represented as a mechanical switch, it will generally take the form of an electronic switch in practice.

For reproduction, the heads 1, 2, 3 and 4 are connected to a switch 18 which in accordance with a cyclic permutation connects the heads 1, 2, 3 and 4 to the input of a read amplifier 20, having an output 21, via a switch 19. Switch 18, which may take the form of an electronic switch, connects the heads 1, 2, 3 and 4 to the read amplifier 20 in the sequence described with reference to FIG. 4. In the case of reproduction during recording, switch 18 lags the switch 16 by one revolution of the head support 7 (=360°), one step of the switch corresponding to 270°. For this purpose the switches 16 and 18 are actuated by a switching generator 22, which is for example synchronized by a tachogenerator 23 which is coupled to the shaft of the head support 7.

For actuation of the switches 15 and 19, there may be provided an actuating circuit 24. Switch 15 is then closed in a mode to be referred to as "recording", while during recording in the "monitor" mode switch 19 is also closed and in the "reproduction" mode switch 19 is closed and switch 15 is open.

The description is based on an apparatus having four heads. However, any number n, n being greater than 2, yields a reduction of the drum diameter by a factor of approximately $$2\frac{n-1}{n}$$

relative to the two-head apparatus.

The minimum tape wrap angle is then equal to $$\frac{n-1}{n} \times 360°.$$

In the case of a two-head apparatus it is known to arrange the gaps of the two heads at an angle relative to each other in order to reduce cross-talk. This is also possible in an apparatus in accordance with the invention having an even number of heads. The gaps of the heads are then alternately arranged at angles of $+\alpha$ and $-\alpha$ relatively to the normal to the track direction.

What is claimed is:

1. An apparatus for recording and/or reproducing signals on a magnetic tape, said apparatus comprising a generally cylindrical head drum having a circumferential gap disposed in a plane normal to the axis of the drum, a head support mounted inside said drum for rotation about said axis, at least three heads supported on said support for rotation therewith in the plane of said gap, said heads being disposed opposite said gap and uniformly spaced from each other, and means for guiding the magnetic tape along a helical path around said drum over at least $$\frac{n-1}{n} \times 360°$$

of the circumference of said drum with a pitch such that at least $$\frac{n-1}{n} \times 360°$$

of the gap circumference is covered by said tape, wherein n is the number of heads, so that, upon rotation of said support, successive heads make magnetic contact with said tape through said gap.

2. The apparatus according to claim 1 including a signal input for applying to said heads a signal to be recorded on said tape, first switching means for sequentially connecting said signal input to the heads in accordance with a cyclic permutation in synchronism with the rotation of said head support such that respective heads are sequentially connected to said signal input in a sequence corresponding to the direction of rotation of said head support for $$\frac{n-1}{n}$$

part of a revolution thereof.

3. The apparatus according to claim 2 including a signal output for supplying a signal reproduced from said tape and second switching means for connecting said heads to said signal output in a way such that a head which makes magnetic contact with the tape and which is not simultaneously connected to said signal input is connected to said signal output.

4. The apparatus according to claim 3 including means for actuating said second switching means in synchronism with the rotation of said head support and with said first switching means in a way such that a given head is connected to said signal output by said second switching means one revolution of said head support after said given head has been connected to said signal input by said first switching means.

5. The apparatus according to claim 1 including a signal output for supplying a signal reproduced from said tape and switching means for sequentially connecting said signal output to said heads in accordance with a cyclic permutation in synchronism with the rotation of said head support such that said heads are sequentially connected to said signal output in a sequence corresponding to the direction of rotation of the head support for $$\frac{n-1}{n}$$

part of a revolution of said head support.

* * * * *